UNITED STATES PATENT OFFICE.

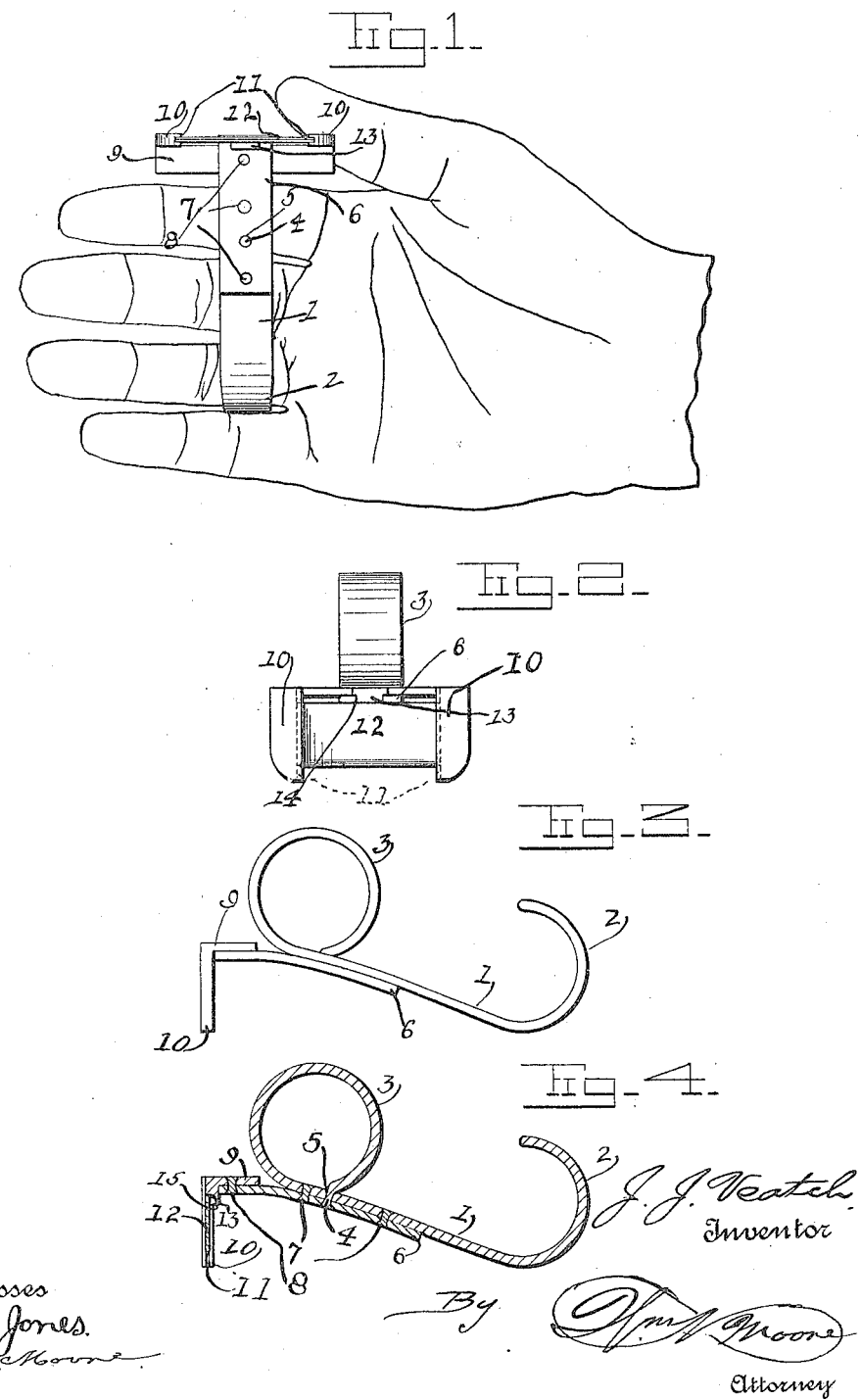

JOHN J. VEATCH, OF FAIRBURY, NEBRASKA.

FRUIT-PICKING IMPLEMENT.

1,180,212.   Specification of Letters Patent.   Patented Apr. 18, 1916.

Application filed October 17, 1914. Serial No. 867,083.

*To all whom it may concern:*

Be it known that I, JOHN J. VEATCH, a citizen of the United States, residing at Fairbury, in the county of Jefferson and State of Nebraska, have invented certain new and useful Improvements in Fruit-Picking Implements, of which the following is a specification.

My invention relates to improvements in fruit picking implements, and refers particularly to a knife or implement for cutting hanging or stemmed fruit such as grapes, pears, plums and the like, the main object being the provision of an implement which will fit upon the hand and dispose the blade in the most desirable position to quickly sever the stem and allow the fruit to fall into the hand insuring rapidity in gathering and preventing injury to the fruit.

Another object of my invention is the provision of an implement of the character and for the purpose stated which will be small in size; which will permit the blade to be easily applied and removed; which will be durable and cheap; and which in general will be thoroughly efficient and practical.

With these objects in view my invention consists of a fruit picking implement embodying novel features of construction and arrangement of parts for service substantially as shown, described and claimed.

Figure 1 is a view of the hand showing my implement in position for use. Fig. 2 is a front end view of the implement, Fig. 3 is a side view and Fig. 4 is a central longitudinal sectional view of the improvement.

The implement consists of a hand grasping portion or member, a blade carrying frame, and a detachable blade which may be of the type used in safety razors.

The grasping member consists of a flat strip or plate 1, formed at its outer end with a hook 2 to engage the third finger and at its other end with a loop 3, to receive the first finger, said loop being formed with a reduced lug 4, fitting in an opening 5 of the plate 1 and serving to hold the loop.

The blade carrying member consists of a flat plate 6, secured by rivets 7, to the grasping member and having secured to its outer portion by fastenings 8, the horizontal cross piece 9, formed with the pair of depending arms 10, having blade receiving grooves 11, to receive the blade 12, which is confined in its upward movement by the tongue 13, in the cross piece. This tongue depends from the cross piece and is of right angled form, being received in a kerf 14, in the outer end of the flat plate 6, and being formed with a stop 15, against which and the ends of plate 6, the upper edge 12, of the blade abuts and is retained in proper position.

The manner of using my implement will be readily understood from the drawing and description, and the device is fitted to the hand, as shown in Fig. 1, and this disposes the blade in position to sever the stem and permits the fruit to fall into the hand, thus enabling a rapid gathering of the fruit without danger of bruising or injury.

It will be noted that blades such as used in safety razors can be employed in my implement and that they can be easily inserted in the grooves of the arms and when in position for use will bear against the tongue and ends of the plate and thus be retained in proper place.

It is evident that my implement is simple, durable, and inexpensive in construction, will operate with ease and rapidity, and is practical in every particular.

I claim:

A fruit picking implement, consisting of a hand grasping portion having a curved portion to receive the ring finger and the second curved portion forming a complete circle to receive the index finger, said circular portion terminating in a reduced end, a plate connected to said hand grasping portion by said reduced end, a transverse piece secured to said plate and having a pair of vertically disposed arms formed with blade receiving grooves, a blade mounted in said grooves and a stop on the cross piece to limit the upward movement of said blade.

In testimony whereof I affix my signature in presence of two witnesses.

JOHN J. VEATCH.

Witnesses:
J. Y. MILLER,
F. B. CROPSEY.

Copies of this patent may be obtained for five cents each, by addressing the "Commissioner of Patents, Washington, D. C."